(12) United States Patent
Petersen

(10) Patent No.: US 11,636,202 B2
(45) Date of Patent: Apr. 25, 2023

(54) PROJECTED VECTOR OVERFLOW PENALTY AS MITIGATION FOR MACHINE LEARNING MODEL STRING STUFFING

(71) Applicant: Cylance Inc., Irvine, CA (US)

(72) Inventor: Eric Glen Petersen, Beaverton, OR (US)

(73) Assignee: Cylance Inc., San Ramon, CA (US)

(*) Notice: Subject to any disclaimer, the term of this patent is extended or adjusted under 35 U.S.C. 154(b) by 314 days.

(21) Appl. No.: 16/798,120

(22) Filed: Feb. 21, 2020

(65) Prior Publication Data

US 2021/0264024 A1    Aug. 26, 2021

(51) Int. Cl.
| | |
|---|---|
| *G06F 21/00* | (2013.01) |
| *G06F 21/55* | (2013.01) |
| *G06N 20/00* | (2019.01) |
| *G06N 5/00* | (2023.01) |
| *G06N 5/04* | (2023.01) |

(52) U.S. Cl.
CPC .......... *G06F 21/554* (2013.01); *G06N 5/003* (2013.01); *G06N 5/04* (2013.01); *G06N 20/00* (2019.01); *G06F 2221/033* (2013.01)

(58) Field of Classification Search
CPC ............. G06F 21/554; G06F 2221/033; G06F 21/562; G06N 5/003; G06N 5/04; G06N 20/00; G06K 9/6269; G06K 9/6256
See application file for complete search history.

(56) References Cited

U.S. PATENT DOCUMENTS

| | | | |
|---|---|---|---|
| 9,516,053 B1 | 12/2016 | Muddu et al. | |
| 9,690,938 B1 | 6/2017 | Saxe et al. | |
| 10,379,995 B1 | 8/2019 | Walters et al. | |
| 2006/0195763 A1* | 8/2006 | Kikuchi | H04N 19/61 714/758 |
| 2017/0372071 A1* | 12/2017 | Saxe | G06F 21/562 |
| 2018/0013772 A1* | 1/2018 | Schmidtler | H04L 67/06 |
| 2018/0314835 A1 | 11/2018 | Dodson et al. | |
| 2019/0260775 A1* | 8/2019 | Bartos | G06F 21/564 |
| 2019/0286242 A1* | 9/2019 | Ionescu | G06F 17/18 |

(Continued)

FOREIGN PATENT DOCUMENTS

| | | | |
|---|---|---|---|
| GB | WO2020/030913 | * | 2/2020 |
| WO | 2020030913 A1 | | 2/2020 |

OTHER PUBLICATIONS

Non-Final Office Action issued on U.S. Appl. No. 16/832,778, dated Mar. 17, 2022.

(Continued)

*Primary Examiner* — Ghazal B Shehni
(74) *Attorney, Agent, or Firm* — Jones Day

(57) ABSTRACT

An artifact is received from which features are extracted and used to populate a vector. The features in the vector are then reduced using a feature reduction operation to result in a modified vector having a plurality of buckets. Features within the buckets of the modified vector above a predetermined projected bucket clipping threshold are then identified. Using the identified features, and overflow vector is then generated. The modified vector is then input into a classification model to generate a score. This score is adjusted based on the overflow vector and can then be provided to a consuming application or process. Related apparatus, systems, techniques and articles are also described.

20 Claims, 4 Drawing Sheets

(56) References Cited

U.S. PATENT DOCUMENTS

2020/0302058 A1* 9/2020 Kenyon ............... G06F 21/554
2020/0401696 A1* 12/2020 Ringlein ............... G06N 3/08

OTHER PUBLICATIONS

Extended European Search Report issued on EP Application No. 21158774.6 dated Jan. 25, 2022.

Yingying et al: "Defending Against Adversarial Examples via Soft Decision Trees Embedding", Proceedings of the 28th ACM Joint Meeting on European Software Engineering Conference and Symposium on the Foundations of Software Engineering, ACM, New York, NY, USA, Oct. 15, 2019 (Oct. 15, 2019), pp. 2106-2114.

Jehyun et al: "Building Robust Phishing Detection System: an Empirical Analysis", Proceedings 2020 Workshop on Measurements, Attacks, and Defenses for the Web, Jan. 1, 2020 (Jan. 1, 2020).

Extended European Search Report issued for EP Application No. 211575592, dated Jul. 16, 2021.

Dahl et al., "Large-scale malware classification using random projections and neural networks." 2013 IEEE International Conference on Acoustics, Speech and Signal Processing. IEEE, 2013.

Yan et al., "Exploitmeter: Combining fuzzing with machine learning for automated evaluation of software exploitability." 2017 IEEE Symposium on Privacy-Aware Computing (PAC). IEEE, 2017.

Wang et al., "A systematic review of fuzzing based on machine learning techniques." PloS one 15.8 (2020) e0237749.

Final Office Action dated Sep. 28, 2022 issued on U.S. Appl. No. 16/832,778 (10 pages).

* cited by examiner

PROJECTED VECTOR OVERFLOW PENALTY AS MITIGATION FOR MACHINE LEARNING MODEL STRING STUFFING

TECHNICAL FIELD

The subject matter described herein is directed to mitigating the effects of adversarial techniques such as score fuzzing and string stuffing which can act to cause machine learning model to misclassify a particular artifact.

BACKGROUND

Machine learning and other types of artificial intelligence models are being increasingly deployed across different applications and industries. Such models provide classifications which can be based, for example, on historical data with known outcomes or features. The classifications provided by such models (i.e., the model outputs, etc.) can take various forms including a Boolean output (e.g., good/bad, etc.), a numerical score (e.g., 0.00 to 1, 1 to 100, etc.), or a grouping (e.g., automobile, pedestrian, crosswalk, etc.). With some software implementations, the outputs of such models can be intercepted even when part of a larger workflow. Such interception can allow a malicious actor to manipulate the classification by such models by repeatedly modifying sample input data until a desired classification is received (even if such classification is not ultimately accurate).

One type of manipulation is referred to as score fuzzing. Score fuzzing can be accomplished by adding one string at a time from a large list of candidate strings to a malicious file (i.e., malware sample). The list of candidate strings can be gathered by running UNIX strings utility on a large group of common application and library portable executable (PE files). Score fuzzing then modifies a baseline malware sample with each of those strings one at a time, and is used to determine which of those strings have a positive influence on the score. Multiple strings with a positive influence are then added to an existing section of an existing malware sample, or in the simplest case appended to the end of the file in order to cause a model to misclassify the malware sample as benign or otherwise safe to execute or access.

SUMMARY

In a first aspect, an artifact is received from which features are extracted and used to populate a vector. The features in the vector are then reduced using a feature reduction operation to result in a modified vector having a plurality of buckets. Features within the buckets of the modified vector above a pre-determined projected bucket clipping threshold are then identified. Using the identified features, and overflow vector is then generated. The modified vector is then input into a classification model to generate a score. This score is adjusted based on the overflow vector and can then be provided to a consuming application or process.

The classification model can characterize the artifact as being malicious or benign to access, execute, or continue to execute. Access or execution of the artifact can be prevented when the classification model characterizes the artifact as being malicious.

The classification model can be a machine learning model trained using a training data set and it can provide a continuous scale output. The machine learning model can take various forms and include one or more of: a logistic regression model, a neural network, a convolutional neural network, a recurrent neural network, a generative adversarial network, a support vector machine, a random forest, or a Bayesian model, and the like.

The features can include alphanumeric strings.

A plurality of vectorized malware samples can be inputted into the classification model so that a plurality of scores based on the inputted vectorized malware samples are obtained. Based on the classifications, buckets of the vectorized malware samples that influence the scores above the pre-determined threshold can be identified.

The classification model can be a machine learning-based penalty model trained using training data that is synthesized by stuffing strings into benign and malware samples and providing a continuous scale output.

A broad overflow summation can be calculated using the overflow vector which totals a number of buckets having features exceeding the pre-determined projected bucket clipping threshold. A weighted overflow summation can be calculated using the overflow vector in which certain buckets are weighted based on an empirical determination of how such buckets influence the score. The score can be adjusted based on a heuristic applying the broad overflow summation and the weighted overflow summation. The score can be adjusted by inputting both of the broad overflow summation and the weighted overflow summation into a machine learning model.

Features within the modified vector can be clipped prior to generating the overflow vector.

The feature reduction operation can take various forms including random projection matrices and/or principal component analysis.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, the current subject matter provides enhanced techniques for preventing the bypass of machine learning models using techniques such as string stuffing which might otherwise cause such models to misclassifying analyzed artifacts. Further, the current subject matter is advantageous in that provides mitigation techniques can be used in connection with existing machine learning models (e.g., neural networks) without having to train and deploy new machine learning models which address model bypass techniques such as string stuffing.

The details of one or more variations of the subject matter described herein are set forth in the accompanying drawings and the description below. Other features and advantages of the subject matter described herein will be apparent from the description and drawings, and from the claims.

DETAILED DESCRIPTION

The current subject matter is directed to techniques for preventing techniques which seek to cause a classifier to misclassify an artifact. These techniques include, for example, string stuffing in which a plurality of strings (e.g., dozens, hundreds, thousands, etc.) are added to an artifact. The classifier in this regard can be an AI/machine learning model that outputs at least one value that characterizes the input to such model. While the current subject matter provides examples relating to models used for detection of malicious software ("malware"), it will be appreciated that the current subject matter can, unless otherwise specified, apply to other applications/workflows utilizing a model including, for example, autonomous vehicle navigation systems, image analysis systems, biometric security systems, video game cheat circumvention systems, and the like.

In some cases, the output of a classification model can be intercepted and exploited by a malicious actor as part of an adversarial attack. For example, data exchanged between a client and a remote server executing the classification model can be accessed such that small changes can be made to the data (e.g., file, code, artifact, etc.) input into the classification model until a desired outcome (from the point of view of the malicious actor) is obtained. For example, a malicious actor either automatically or through manual modifications can make small changes to a file encapsulating malicious code until such time that classification model determines that such file is safe to execute or otherwise access.

Figure 1:
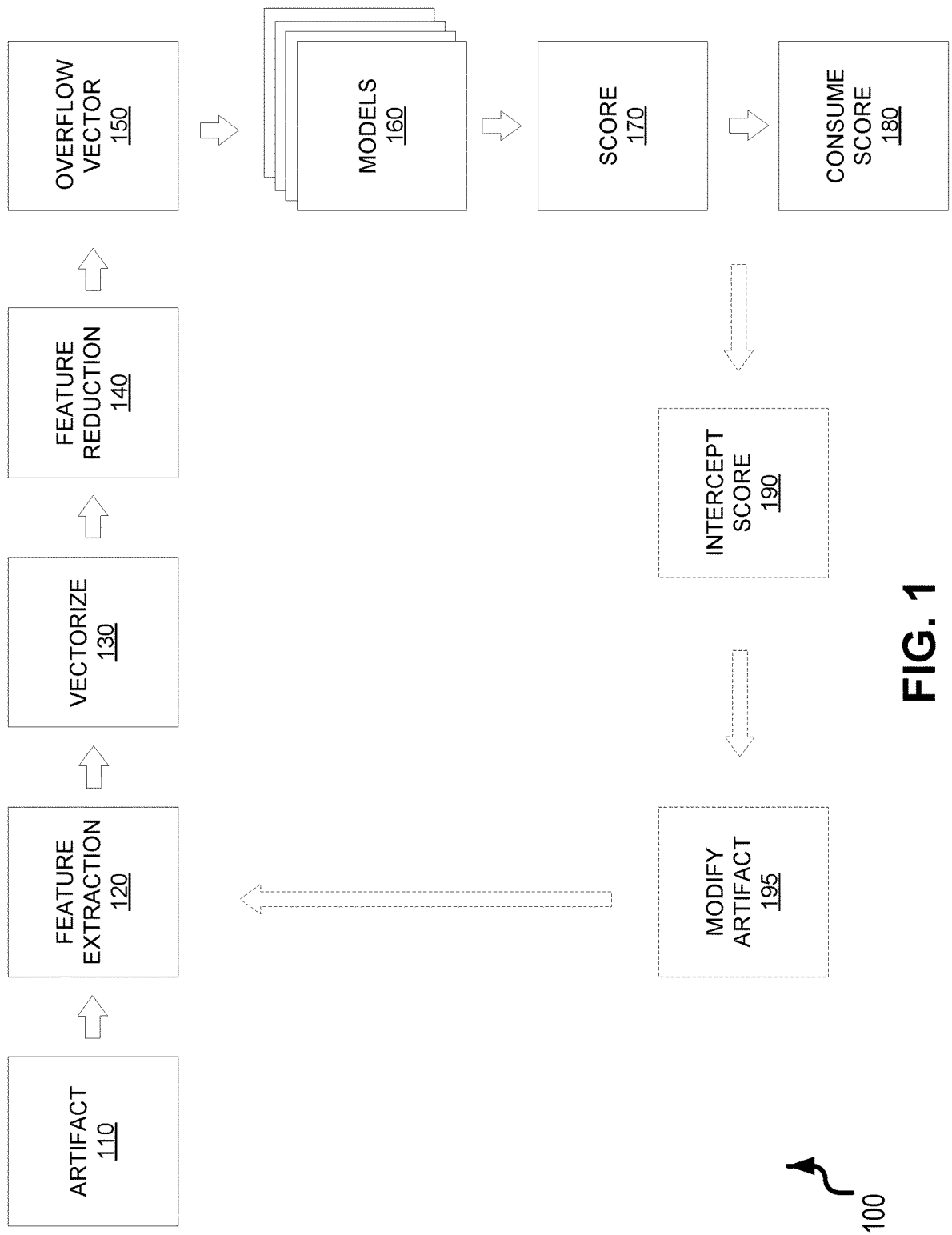
FIG. 1 is a first process flow diagram illustrating a first computer-implemented workflow for determining a projected vector overflow penalty which can be used to adjust a classification score of an artifact.

FIG. 1 is a process flow diagram 100 illustrating a sample computer-implemented workflow for use with the current techniques for mitigating string stuffing. Initially, an artifact 110 can be received (e.g., accessed, loaded, received from a remote computing system, etc.). The artifact 110 can be a file, a portion of a file, metadata characterizing a file, and/or source code. This artifact 110 can be parsed or otherwise processed by an observer. In particular, the observer can extract 120 features (sometimes referred to as attributes or observations) from the artifact and vectorize 130 such features. Further, depending on the complexity and/or quantity of features within a vector, a feature reduction operation 140 can be performed on the vector which reduces the amount of dimensions of such vector. The feature reduction operation 140 can utilize various techniques including, but not limited to, principal component analysis and random projection matrices to reduce the number of extracted features within the vector while, at the same time, remaining useful (i.e., for classification purposes, etc.). As will be described in further detail below, the resulting vectors as part of the feature reduction operation 140 can be used to generate an overflow vector 150. The overflow vector 150 can then be input into one or more classification models 160 (multiple model variations can sometimes be referred to as an ensemble of classification models 150) as well as the reduced feature vector (as part of operation 140).

The classification models 160 can take various forms including, without limitation, a logistic regression model, a neural network (including convolutional neural networks, recurrent neural networks, generative adversarial networks, etc.), a support vector machine, a random forest, a Bayesian model, and the like. The output of the classification models 160 can be a score 170. As used herein, unless otherwise specified, the score can be a numeric value, a classification type or cluster, or other alphanumeric output which, in turn, can be used by a consuming process 180 or application to take some subsequent action. For malware applications, the score can be used to determine whether or not to access, execute, continue to execute, quarantine, or take some other remedial action which would prevent a software and/or computing system from being infected or otherwise infiltrated by malicious code or other information encapsulated within the artifact 110.

FIG. 1 further illustrates the interception of the score 190. Such interception can occur, for example, when the API of the consuming application is known; by dumping DLL/SO exports with link, nm, obj dump; by using various reverse-compilers; by observing stack/heap/registers during execution for function-calling behavior, and the like. Other API (i.e., function)-discovering techniques can also be used.

In an arrangement in which the output of the model 160 can be readily ascertained, the score 160 can be used by a malicious actor to modify the artifact 195 and repeat the process until such time that a desired score 170 is output by the corresponding model 160. For example, the modified artifact 196 can encapsulate malicious script and small changes (i.e., addition of a plurality of strings) to the artifact 110 could result in the corresponding classification model 160 classifying such modified artifact 195 as being benign.

Modifications to an artifact 195 can be done in such a way as to maintain the original character or nature of the artifact 110. In the example of an actor attempting to modify a malicious file (malware), any modifications must be such that the malware still operates as intended. Such modifications can be made by (for instance) adding to, removing from, or altering un-used portions of the malicious file. As these portions of the file are unused, they have no effect on the realized behavior of the file, but may result in a different score 170 from the model 160. Alternatively or additionally, used sections of the artifact 110 can also be modified, so long as the final function of the malware is left intact.

Whether manually, or in an automated system, the actor or system will typically make many small changes, and get new scores 170 from the model 160. Any change that moved the score 170 in the desired direction (i.e. in the malware example, moving the score closer to a value that is interpreted as benign) is maintained, while other changes are discarded. Such an iterative process can be repeated until the cumulative changes to the artifact 110 result in a cumulative change in the score 170 which accomplishes the desired effect. The techniques provided herein can interrupt this cycle of iterative improvements by preventing such model manipulation from resulting in a false or misleading change in the score 170.

The overflow vector 150 as used herein can enable greater detection and conviction of malware samples that have been stuffed with strings or other manipulated features. To reach the next level of detection, with the current subject matter, a score 170 for samples that have been artificially stuffed with strings or other features can be penalized. By capturing an overflow vector (as part of operation 150) which is composed of normalized bucket accumulations (as part of the feature reduction operation 140) that exceed a pre-defined projected bucket clipping threshold, a signal (i.e., the overflow vector 150) can be extracted that is strongly indicative of feature stuffing. Bucket, in this regard, refers to a single features (or if otherwise specified a group of features) which are derived from large numbers of other features (e.g., 20 to 1, etc.) as part of a feature reduction operation.

In some variations, the overflow vector 150 can provide a broad measure that calculates a broad overflow summation (e.g., the number of buckets exceeding a pre-defined projected bucket clipping threshold can be added together). In other variations, the overflow vector 150 can additionally or alternatively provide a weighted overflow summation that is calculated by emphasizing those projected buckets that have a high influence on the output score. These weights can be calculated, during design time, by fuzzing the model(s) 160 with features (e.g., string features, etc.) against a broad set of malware baselines, and producing a vector that describes the score influence per projected bucket. Large portable executable (PE) samples with many strings, for example, will contain more overflowed buckets than small samples, simply because they contain more strings. However, if the weighted overflow vector 150 is substantially out of proportion with the non-weighted overflow vector 150, then this arrangement strongly indicates that well-crafted tampering has taken place.

The overflow vector 150 can be consumed in several ways. In one variation, heuristics can be applied to the weighted and broad overflow summations, and then the result used to reduce the score produced by the model 160. In a more general sense, this can be characterized as a "side-car" model, which acts on the projected vector (generated by the feature reduction operations 140) and produces an output coincident with the model.

In other variations, the overflow vector 150 can be consumed by an overflow vector machine learning model (not shown) that executed in parallel to the model 160. Such an overflow vector machine learning model could take various forms such as logistic regression and/or neural network and be trained using various types of relevant training data. The output of the overflow vector machine learning model can be used to apply a correction or penalty to the output of the main model 160. With this variation, the output of the overflow vector machine learning model is not added to the set of inputs for the main model 160, in that what is being measured by this side-car model is orthogonal to what the main model is being trained to, which is whether the original (untampered) sample is malicious or benign.

One technique for modifying the artifact (at 195) in an effort to cause the model 160 to misclassify is to add (i.e., stuff) the artifact with numerous strings of data (e.g., non-sensical alphanumeric text strings, passages from websites, etc.). The fact that strings may land in the same buckets as other non-string features results in certain models being easily manipulated. The buckets that contain features from upstream models as well as other strong features such as checksum verified features that have a larger than typical contribution to the overall score.

Figure 2:
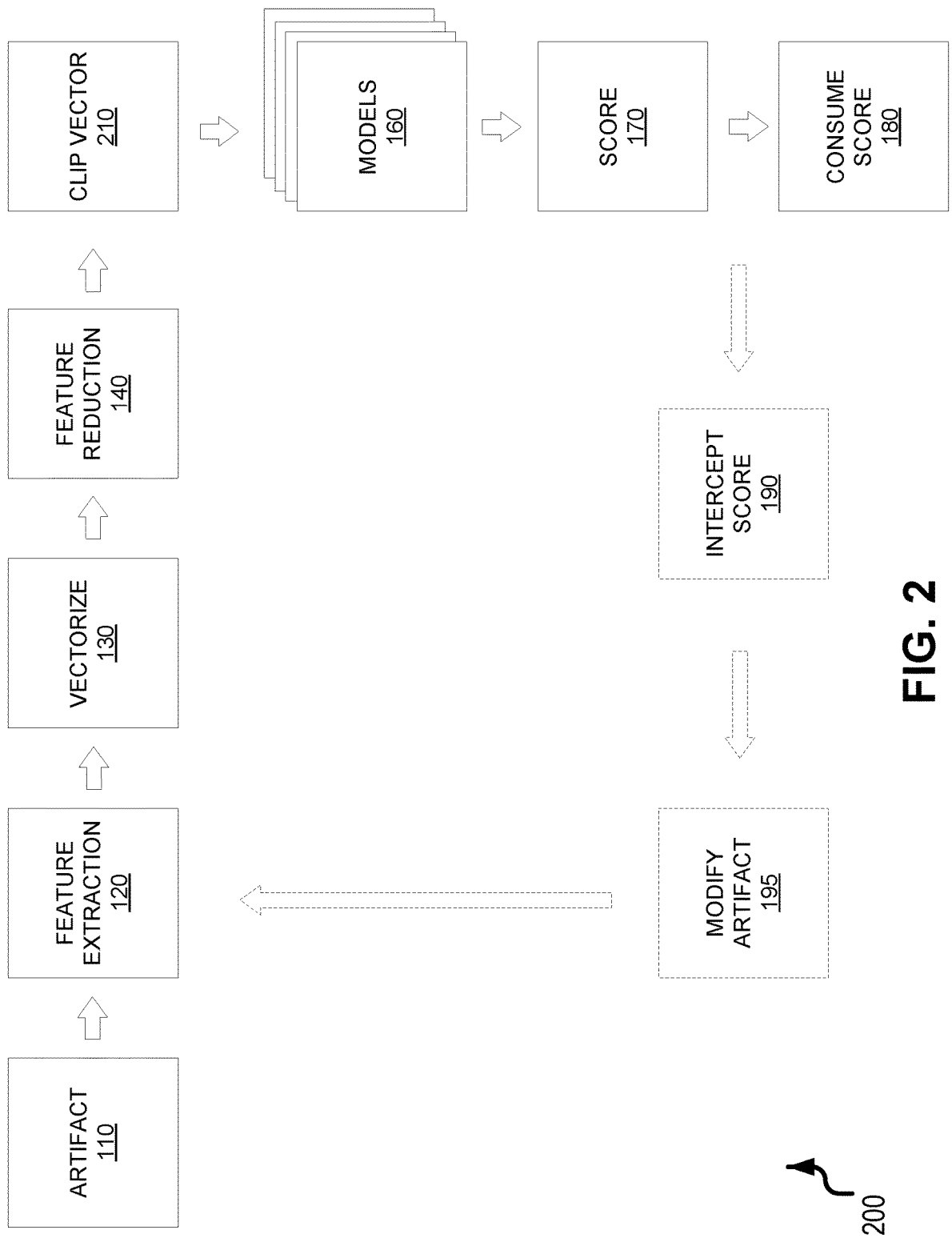
FIG. 2 is a diagram illustrating clipping of projected vectors derived from an artifact prior to classification.

FIG. 2 is a diagram 200 illustration a variation of the workflow of FIG. 1 in which, rather than using an overflow vector operation 150, a vector clipping operations 210 is performed. It can be presumed that the final confidence score of the model 160 has a strong positive correlation with a small subset of the model inputs (i.e., values in the projection vector). These inputs can be referred to as being "hot". An attacker exploits the model 160 by including a set of additional strings in the sample that largely project into hot inputs. When there is no clipping after projection, an attacker can increase the values of these hot inputs past the levels at which the model was trained, to arbitrarily large inputs only limited by the number of strings that project into a given hot bucket. Ultimately these hot input levels can cause the model output to be fully dominated by the presence of these strings.

In some variations, the projected feature vector (140) can be clipped (210) before it is input into the model 160. If the model 160 is trained without normalizing the projected vector 140, the projected vector cannot be clipped 210 with a constant value. Instead, a clipping vector can be used. The clipping vector can comprise a sequence of 2-tuples (min_clip_threshold, max_clip_threshold) that represent the minimum and maximum allowed values for each index in the projection vector. We propose to define these values as:

$$\text{min\_clip\_threshold}i = \text{mean}_i - N^*\text{std}_i, \text{ and}$$

$$\text{max\_clip\_threshold}i = \text{mean}_i + N^*\text{std}_i;$$

where $\text{mean}_i$ is the average value across a large set of training samples for projected index i, and $\text{std}_i$ is the sample standard deviation of those same values, and N represents the number of standard deviations to allow before clipping.

Clipping inputs without first normalizing them does not guarantee the inputs are all of roughly the same magnitude; that's a problem that cannot be solve without retraining the model 160 (which can be costly in terms of time and use of computing resources). Notwithstanding, the clipping operations 210 can prevent an attacker from exploiting the projection mechanism via strings by assuring that the added strings cannot increase the magnitude of a given model input past some statistically determined threshold.

Figure 3:
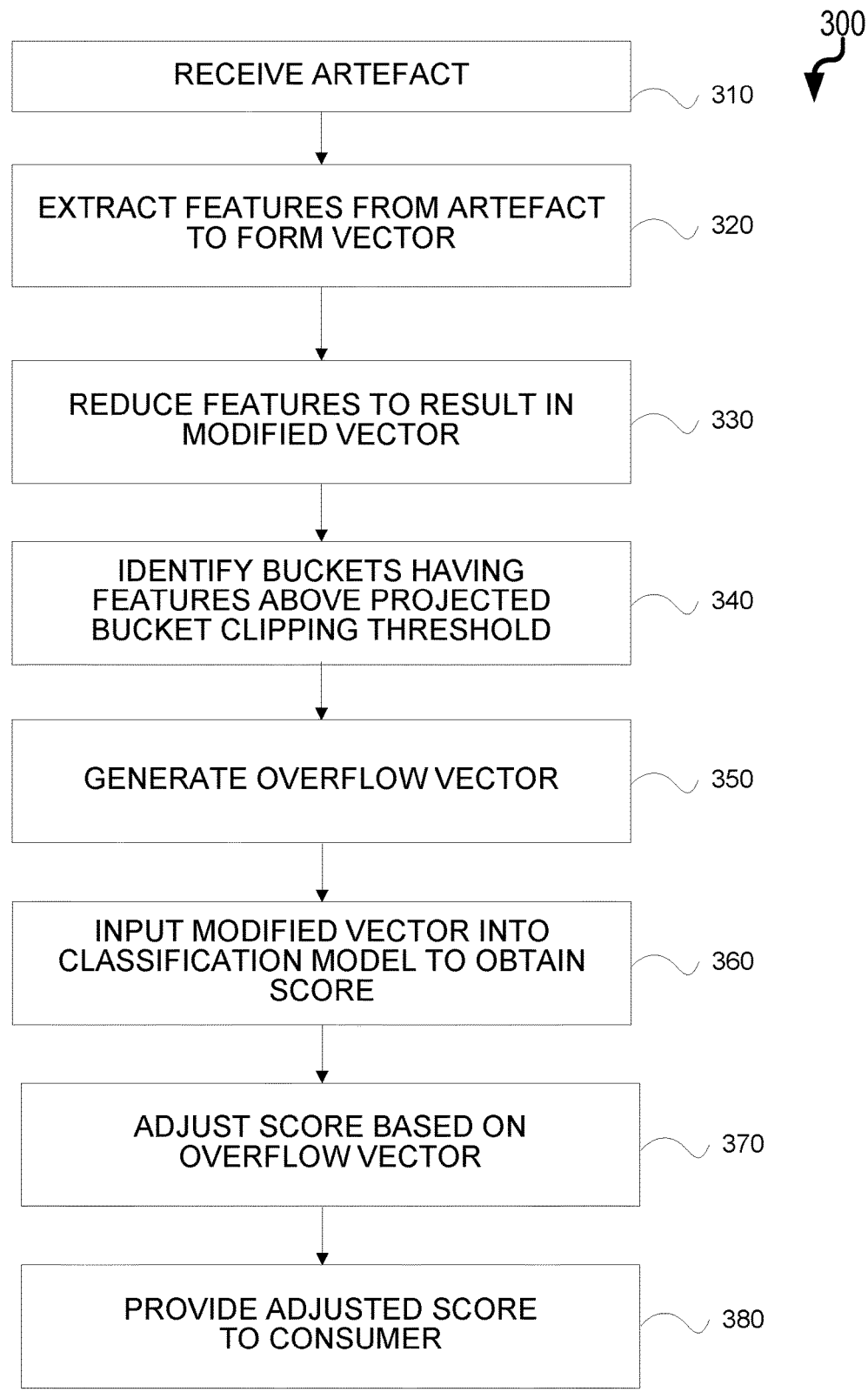
FIG. 3 is a second process flow diagram illustrating a first computer-implemented workflow for determining a projected vector overflow penalty which can be used to adjust a classification score of an artifact.

FIG. 3 is a process flow diagram in which, at 310, an artifact is received. Subsequently, at 320, features are extracted from the artifact to populate a vector. Features in the vector are then reduced, at 330, using a feature reduction operation to result in a modified vector having a plurality of buckets. Thereafter, at 340, features within buckets of the modified vector above a pre-determined projected bucket clipping threshold are identified. These identified features are used, at 350, to generate an overflow vector. This overflow vector is later input, at 360, into a classification model to generate a score. This score can then be adjusted, at 370, based on the overflow vector. The adjusted score can then be provided, at 380, to a consuming application or process.

Figure 4:
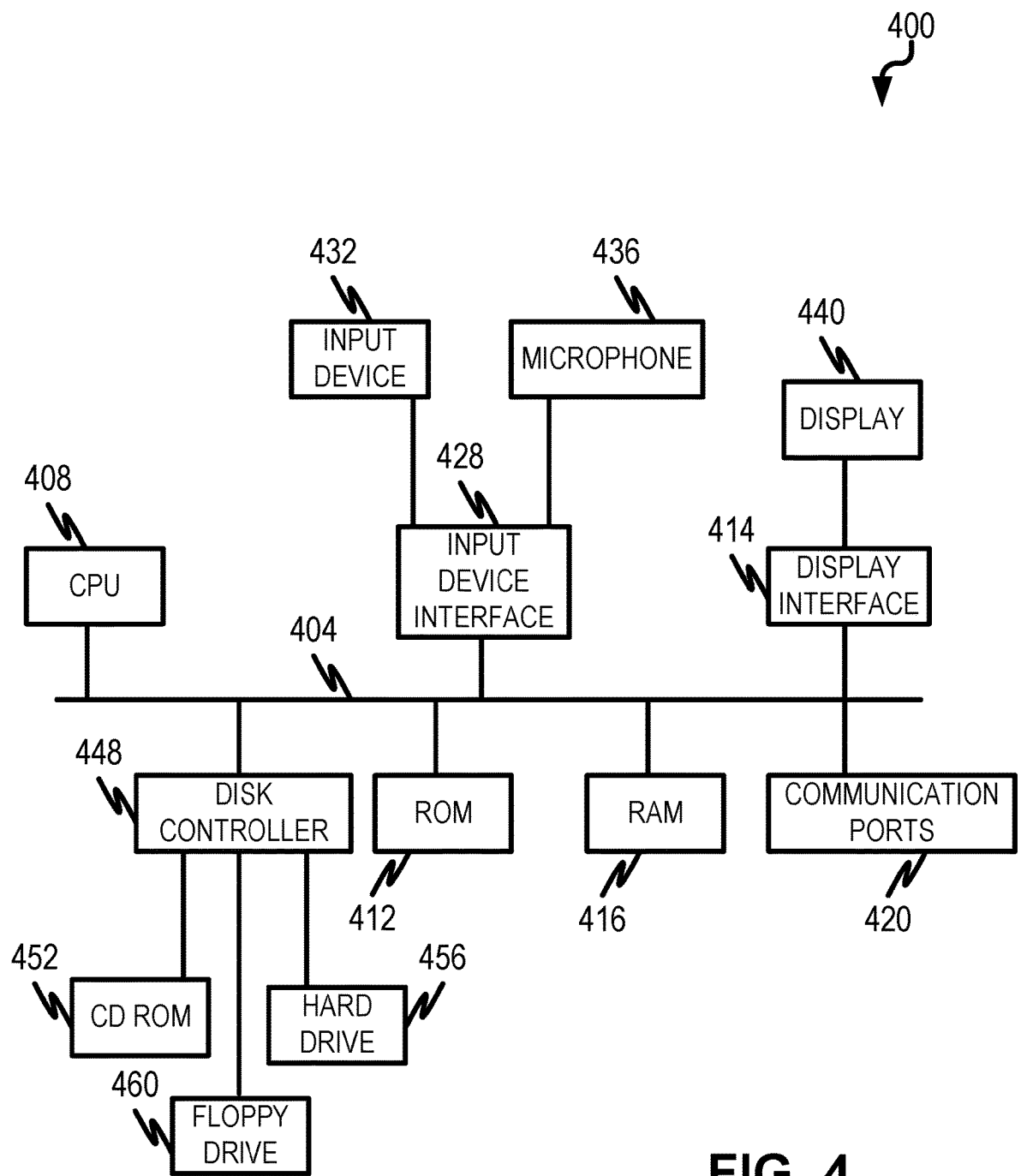
FIG. 4 is a diagram illustrating a computing device that can be used to implement aspects of the current subject matter.

FIG. 4 is a diagram 400 illustrating a sample computing device architecture for implementing various aspects described herein. A bus 404 can serve as the information highway interconnecting the other illustrated components of the hardware. A processing system 408 labeled CPU (central processing unit) (e.g., one or more computer processors/data processors at a given computer or at multiple computers/processor cores, etc.), can perform calculations and logic operations required to execute a program. A non-transitory processor-readable storage medium, such as read only memory (ROM) 412 and random access memory (RAM) 416, can be in communication with the processing system 408 and can include one or more programming instructions for the operations specified here. Optionally, program instructions can be stored on a non-transitory computer-readable storage medium such as a magnetic disk, optical disk, recordable memory device, flash memory, solid state disks, or other physical storage medium.

In one example, a disk controller 448 can interface with one or more optional disk drives to the system bus 404. These disk drives can be external or internal floppy disk drives such as 460, external or internal CD-ROM, CD-R, CD-RW or DVD, or solid state drives such as 452, or external or internal hard drives 456. As indicated previously, these various disk drives 452, 456, 460 and disk controllers are optional devices. The system bus 404 can also include at least one communication port 420 to allow for communication with external devices either physically connected to the computing system or available externally through a wired or wireless network. In some cases, the at least one communication port 430 includes or otherwise comprises a network interface.

To provide for interaction with a user, the subject matter described herein can be implemented on a computing device having a display device 430 (e.g., a CRT (cathode ray tube) or LCD (liquid crystal display) monitor) for displaying information obtained from the bus 404 via a display interface 414 to the user and an input device 432 such as keyboard and/or a pointing device (e.g., a mouse or a trackball) and/or a touchscreen by which the user can provide input to the computer. Other kinds of input devices 432 can be used to provide for interaction with a user as well; for example, feedback provided to the user can be any form of sensory feedback (e.g., visual feedback, auditory feedback by way of a microphone 436, or tactile feedback); and input from the user can be received in any form, including acoustic, speech, or tactile input. The input device 432 and the microphone 436 can be coupled to and convey information via the bus 404 by way of an input device interface 428. Other computing devices, such as dedicated servers, can omit one or more of the display 440 and display interface 414, the input device 432, the microphone 436, and input device interface 428.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) and/or a touch screen by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method comprising:
receiving an artifact;
extracting features from the artifact and populating a vector;
reducing features in the vector using a feature reduction operation to result in a modified vector having a plurality of buckets;
identifying features within buckets of the modified vector above a pre-determined projected bucket clipping threshold;
generating an overflow vector based on the identified features which characterizes a level of feature stuffing in the artifact;
inputting the modified vector into a classification model to generate a score for the artifact, the score indicating that the artifact is benign to access, execute, or continue to execute;
adjusting the score for the artifact based on the overflow vector, the adjusted score indicating that the artifact is malicious to access, execute, or continue to execute; and
providing the adjusted score for the artifact to a consuming application or process.

2. The method of claim 1 further comprising: preventing access or execution of the artifact when the classification model characterizes the artifact as being malicious.

3. The method of claim 1, wherein the classification model is a machine learning model trained using a training data set and providing a continuous scale output.

4. The method of claim 3, wherein the machine learning model comprises one or more of: a logistic regression model, a neural network, a convolutional neural network, a recurrent neural network, a generative adversarial network, a support vector machine, a random forest, or a Bayesian model.

5. The method of claim 1, wherein the features comprises alphanumeric strings.

6. The method of claim 1 further comprising:
inputting a plurality of vectorized malware samples into the classification model;
obtaining a plurality of scores based on the inputted vectorized malware samples; and
identifying, based on the classifications, buckets of the vectorized malware samples that influence the scores above the pre-determined threshold.

7. The method of claim 1, wherein the classification model is a machine learning-based penalty model trained using training data that is synthesized by stuffing strings into benign and malware samples and providing a continuous scale output.

8. The method of claim 1 further comprising:
calculating, using the overflow vector, a broad overflow summation totaling a number of buckets having features exceeding the pre-determined projected bucket clipping threshold.

9. The method of claim 8 further comprising:
calculating, using the overflow vector, a weighted overflow summation in which certain buckets are weighted based on an empirical determination of how such buckets influence the score.

10. The method of claim 9, wherein the score is adjusted based on a heuristic applying the broad overflow summation and the weighted overflow summation.

11. The method of claim 9, wherein the score is adjusted by inputting both of the broad overflow summation and the weighted overflow summation into a machine learning model.

12. The method of claim 1 further comprising:
clipping features within the modified vector prior to generating the overflow vector.

13. The method of claim 1, wherein the feature reduction operation comprises random projection matrices.

14. The method of claim 1, wherein the feature reduction operation comprises principal component analysis.

15. A system comprising:
at least one data processor; and
memory storing instructions which, when executed by the at least one data processor, result in operations comprising:
receiving an artifact;
extracting features from the artifact and populating a vector;
reducing features in the vector using a feature reduction operation to result in a modified vector having a plurality of buckets;
identifying features within buckets of the modified vector above a pre-determined projected bucket clipping threshold;
generating an overflow vector based on the identified features which characterizes a level of feature stuffing in the artifact;
inputting the modified vector into a classification model to generate a score for the artifact, the score indicating that the artifact is benign to access, execute, or continue to execute;
adjusting the score for the artifact based on the overflow vector, the adjusted score indicating that the artifact is malicious to access, execute, or continue to execute; and
providing the adjusted score for the artifact to a consuming application or process.

16. The system of claim 15, wherein the operations further comprise:
preventing access or execution of the artifact when the classification model characterizes the artifact as being malicious.

17. The system of claim 15, wherein the classification model is a machine learning model trained using a training data set and providing a continuous scale output.

18. The system of claim 17, wherein the machine learning model comprises one or more of: a logistic regression model, a neural network, a convolutional neural network, a recurrent neural network, a generative adversarial network, a support vector machine, a random forest, or a Bayesian model.

19. A non-transitory computer program product storing instructions which, when executed by at least one computing device, result in operations comprising:
receiving an artifact;
extracting features from the artifact and populating a vector;
reducing features in the vector using a feature reduction operation to result in a modified vector having a plurality of buckets;
identifying features within buckets of the modified vector that are indicative of feature stuffing and which are above a pre-determined projected bucket clipping threshold;

generating an overflow vector based on the identified features which characterizes a level of feature stuffing in the artifact;

inputting the modified vector into a classification model to generate a score for the artifact, the score indicating that the artifact is benign to access, execute, or continue to execute;

adjusting the score for the artifact based on the overflow vector, the adjusted score indicating that the artifact is malicious to access, execute, or continue to execute; and providing the adjusted score for the artifact to a consuming application or process.

20. The non-transitory computer program product of claim 19, wherein the operations further comprise:

preventing access or execution of the artifact when the classification model characterizes the artifact as being malicious.

* * * * *